(12) United States Patent
Miloseski et al.

(10) Patent No.: US 8,839,292 B1
(45) Date of Patent: Sep. 16, 2014

(54) SYSTEMS AND METHODS FOR RENDERING MULTIPLE APPLICATIONS ON TELEVISION SCREENS

(71) Applicants: Dennis Miloseski, Danville, CA (US); Justin Koh, Mountain View, CA (US); Pierre-Yves Laligand, Palo Alto, CA (US); Leo Baghdassarian, Palo Alto, CA (US); Jason Bayer, San Francisco, CA (US)

(72) Inventors: Dennis Miloseski, Danville, CA (US); Justin Koh, Mountain View, CA (US); Pierre-Yves Laligand, Palo Alto, CA (US); Leo Baghdassarian, Palo Alto, CA (US); Jason Bayer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/714,262

(22) Filed: Dec. 13, 2012

Related U.S. Application Data

(60) Provisional application No. 61/570,254, filed on Dec. 13, 2011.

(51) Int. Cl.
| | |
|---|---|
| *H04N 5/445* | (2011.01) |
| *H04N 7/173* | (2011.01) |
| *G06F 3/00* | (2006.01) |
| *G06F 13/00* | (2006.01) |
| *H04N 21/482* | (2011.01) |

(52) U.S. Cl.
CPC .................................. *H04N 21/482* (2013.01)
USPC ............................................ 725/37; 725/110

(58) Field of Classification Search
CPC ........................ H04N 21/4312; H04N 21/4858
See application file for complete search history.

(56) References Cited

U.S. PATENT DOCUMENTS

| | | | | |
|---|---|---|---|---|
| 5,742,285 | A  * | 4/1998 | Ueda ............................. | 715/778 |
| 7,206,029 | B2 * | 4/2007 | Cohen-Solal ................. | 348/565 |
| 2009/0298418 | A1 * | 12/2009 | Michael et al. .............. | 455/3.04 |
| 2010/0064248 | A1 * | 3/2010 | Lee et al. ...................... | 715/781 |
| 2011/0258656 | A1 * | 10/2011 | Michel ........................... | 725/27 |
| 2012/0109592 | A1 * | 5/2012 | Potter et al. .................... | 703/1 |
| 2012/0144424 | A1 * | 6/2012 | Ganesan et al. ............... | 725/40 |
| 2012/0303548 | A1 * | 11/2012 | Johnson et al. ............. | 705/36 R |
| 2013/0039282 | A1 * | 2/2013 | Dhere ........................... | 370/329 |

\* cited by examiner

*Primary Examiner* — Benjamin R Bruckart
*Assistant Examiner* — Akshay Doshi
(74) *Attorney, Agent, or Firm* — Morgan, Lewis & Bockius LLP

(57) ABSTRACT

A method for rendering application user interfaces includes providing a user interface of a first application for display on a television screen, and, while providing the user interface of the first application for display on the television screen, providing a user interface of a second application for concurrent display with the user interface of the first application, in a predefined user interface region, on the television screen. The method also includes, while providing the user interface of the second application, receiving a request for a user interface of a third application. The method further includes, in response to receiving the request for the user interface of the third application, providing a user interface of the third application, instead of the user interface of the second application, for concurrent display with the user interface of the first application, in the predefined user interface region, on the television screen.

14 Claims, 12 Drawing Sheets

→ 500

502 Provide a user interface of a first application of a plurality of applications for display on a television screen

504 While providing the user interface of the first application for display on the television screen, provide a user interface of a second application, distinct from the first application, of the plurality of applications for concurrent display with the user interface of the first application, in a predefined user interface region, on the television screen > 506 One of the first application and the second application is a media player, and the second application is distinct from the first application > 508 The user interface of the first application and the user interface of the second application collectively correspond to the entire television screen > 510 A position of the predefined user interface region is at least initially determined by the first application > 512 Provide one or more user interface objects for display on the television screen. The predefined user interface region is positioned in accordance with positions of the one or more user interface objects.

514 While providing the user interface of the second application for concurrent display with the user interface of the first application on the television screen, receive a request for a user interface of a third application, distinct from the first application and the second application, of the plurality of applications (A)

Figure 5A

516 In response to receiving the request for the user interface of the third application, provide a user interface of the third application, instead of the user interface of the second application, for concurrent display with the user interface of the first application, in the predefined user interface region, on the television screen > 518 Providing the user interface of the third application includes: initiating execution of the third application by one or more processors, and ceasing execution of the second application by the one or more processors.

> 520 Providing the user interface of the third application includes: initiating execution of the third application by the one or more processors, and maintaining execution of the second application by the one or more processors.

522 Providing the user interface of the second application includes providing a first position of the predefined user interface region, the first position of the predefined user interface region being at least initially determined by the second application; and providing the user interface of the third application includes providing a second position of the predefined user interface region, the second position of the predefined user interface region being at least initially determined by the third application

524 Receive a request to move the predefined user interface region; and, in response to receiving the request to move the predefined user interface region, move the predefined user interface region in accordance with the request > 526 Receiving the request includes receiving a user input at a respective location on the television screen, the respective location corresponding to a location inside the predefined user interface region

528 Receive a request to resize the predefined user interface region; and, in response to receiving the request to resize the predefined user interface region, resize the predefined user interface region in accordance with the request

Figure 5B

SYSTEMS AND METHODS FOR RENDERING MULTIPLE APPLICATIONS ON TELEVISION SCREENS

RELATED APPLICATIONS

This application claims priority to and incorporates by reference in its entirety U.S. patent application Ser. No. 61/570,254, filed Dec. 13, 2011, entitled, "Systems and Methods for Rendering Multiple Applications on Television Screens."

TECHNICAL FIELD

The disclosed implementations relate generally to rendering multiple applications on television screens.

BACKGROUND

Television devices (e.g., televisions and receivers coupled to televisions) have been traditionally used to access various television programs. Some television devices are capable of displaying two television programs simultaneously.

Increasingly, television devices are used to access other multimedia contents and information from websites and to execute and display programs. However, traditional methods for displaying television programs are not well suited for simultaneously displaying a television program and a user interface of a non-television program, or user interfaces of multiple non-television programs. Thus, simultaneously displaying user interfaces of non-television programs on television screens requires considerations different from displaying television programs on television screens.

SUMMARY

A number of implementations (e.g., of computer systems or devices, and methods of operating such systems or devices) that overcome the limitations and disadvantages described above are presented in more detail below. These implementations provide methods, systems, and graphical user interfaces (GUIs) for rendering application user interfaces on a television screen.

As described in more detail below, some implementations involve a method for rendering application user interfaces on a television screen. The method includes providing a user interface of a first application of a plurality of applications for display on the television screen, and, while providing the user interface of the first application for display on the television screen, providing a user interface of a second application, distinct from the first application, of the plurality of applications for concurrent display with the user interface of the first application, in a predefined user interface region, on the television screen. The method also includes, while providing the user interface of the second application for concurrent display with the user interface of the first application on the television screen, receiving a request for a user interface of a third application, distinct from the first application and the second application, of the plurality of applications. The method further includes, in response to receiving the request for the user interface of the third application, providing a user interface of the third application, instead of the user interface of the second application, for concurrent display with the user interface of the first application, in the predefined user interface region, on the television screen.

In accordance with some implementations, a computer system for rendering application user interfaces on a television screen of a device includes one or more processors, and memory storing a plurality of applications for execution by the one or more processors. The memory includes one or more instructions for providing a user interface of a first application of the plurality of applications for display on the television screen, and, while providing the user interface of the first application for display on the television screen, providing a user interface of a second application, distinct from the first application, of the plurality of applications for concurrent display with the user interface of the first application, in a predefined user interface region, on the television screen. The memory also includes one or more instructions for, while providing the user interface of the second application for concurrent display with the user interface of the first application on the television screen, receiving a request for a user interface of a third application, distinct from the first application and the second application, of the plurality of applications. The memory further includes one or more instructions for, in response to receiving the request for the user interface of the third application, providing a user interface of the third application, instead of the user interface of the second application, for concurrent display with the user interface of the first application, in the predefined user interface region, on the television screen.

In accordance with some implementations, a non-transitory computer readable storage medium stores a plurality of applications for execution by one or more processors of a computer system. The computer readable storage medium includes one or more instructions for providing a user interface of a first application of the plurality of applications for display on the television screen, and, while providing the user interface of the first application for display on the television screen, providing a user interface of a second application, distinct from the first application, of the plurality of applications for concurrent display with the user interface of the first application, in a predefined user interface region, on the television screen. The computer readable storage medium also includes one or more instructions for, while providing the user interface of the second application for concurrent display with the user interface of the first application on the television screen, receiving a request for a user interface of a third application, distinct from the first application and the second application, of the plurality of applications. The computer readable storage medium further includes one or more instructions for, in response to receiving the request for the user interface of the third application, providing a user interface of the third application, instead of the user interface of the second application, for concurrent display with the user interface of the first application, in the predefined user interface region, on the television screen.

Thus, computer systems are provided with improved methods for rendering application user interfaces on television screens. Multiple application user interfaces are rendered for concurrent display, thereby enabling respective users to better utilize the television screen and interact efficiently with the multiple application user interfaces.

BRIEF DESCRIPTION OF THE DRAWINGS

For a better understanding of the aforementioned implementations as well as additional aspects and implementations thereof, reference should be made to the Description of Implementations below, in conjunction with the following drawings in which like reference numerals refer to corresponding parts throughout the figures.

FIGS. 5A-5B are flowcharts representing a method for rendering application user interfaces, in accordance with some implementations.

Like reference numerals refer to corresponding parts throughout the drawings.

DETAILED DESCRIPTION

Methods and systems for rendering application user interfaces are described. Reference will be made to certain implementations, examples of which are illustrated in the accompanying drawings. While particular implementations are described herein, it will be understood that the described implementations are not intended to limit the scope of claims to these particular implementations alone.

Moreover, in the following description, numerous specific details are set forth to provide a thorough understanding of the described implementations. However, it will be apparent to one of ordinary skill in the art that some implementations may be practiced without these particular details. In other instances, methods, procedures, components, and networks that are well-known to those of ordinary skill in the art are not described in detail to avoid obscuring aspects of the implementations described in this document.

Figure 1:
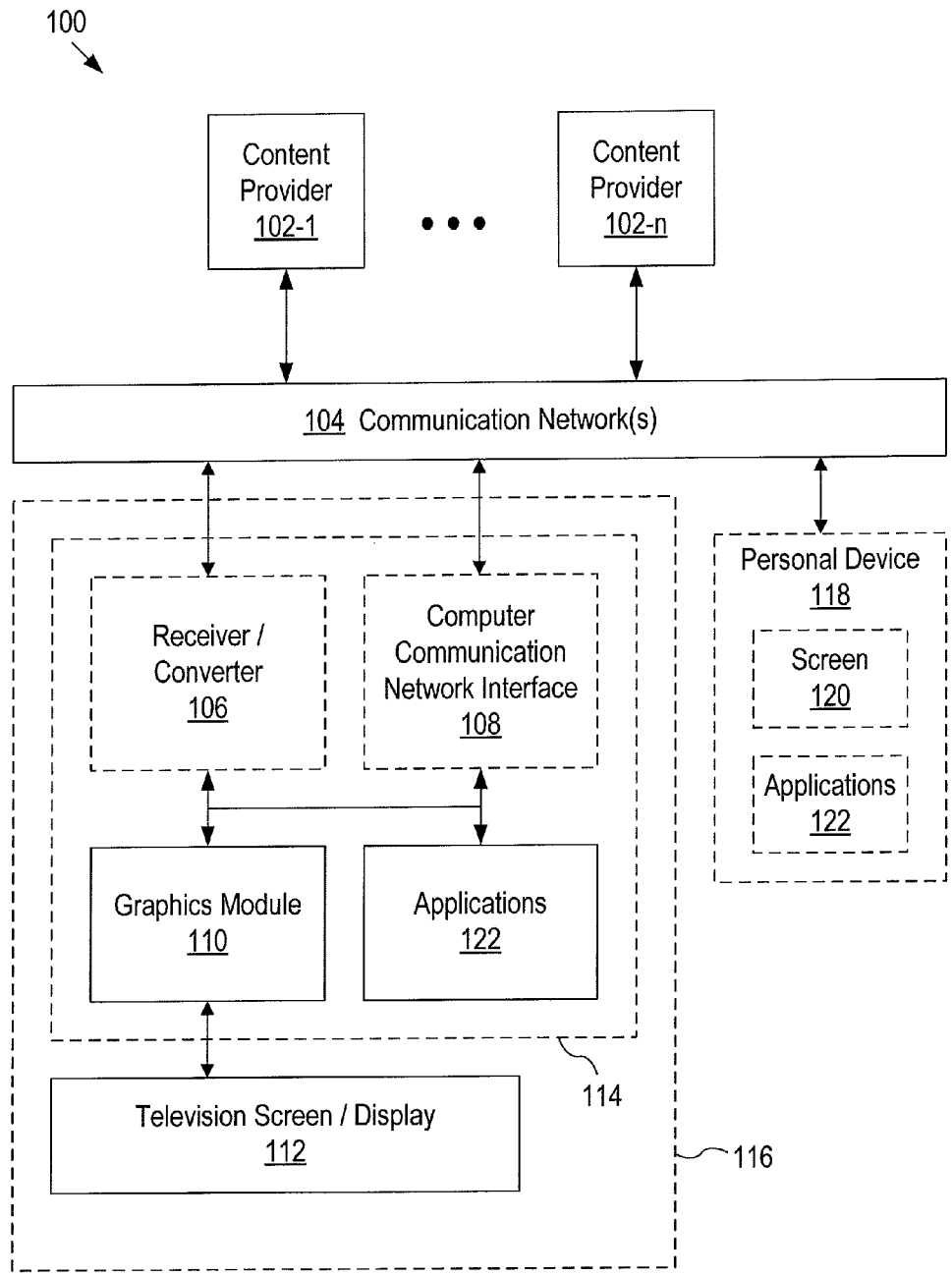
FIG. 1 is a block diagram illustrating an exemplary content distribution system, in accordance with some implementations.

FIG. 1 is a block diagram illustrating an exemplary content distribution system 100, according to certain implementations. In FIG. 1, the system 100 includes one or more content providers 102 and communications networks 104. Connected to the communication networks 104 is a companion device 114 coupled with a television screen 112 or an integrated television device 116 that includes the television screen 112 and components of the companion device 114 (e.g., a network interface 108 and/or a graphics module 110 described below). In some implementations, the companion device 114 is a set-top box or is a computing device that includes set-top box functionality. Various implementations of the companion device 114 and/or the integrated television device 116 implement the methods described in this document. For the purposes of this application, a television screen 112 is typically a large viewing screen (e.g., in some implementations, a viewing screen 26" or larger) fabricated using any suitable display technology (e.g., projection, LCD, plasma, OLED, CRT, etc.) that is intended for viewing from a distance of more than a few feet and for displaying images—commonly in response to some manner of remote control.

As used herein, content providers 102 are systems or devices configured to provide media content (e.g., music, television programs, movies, social media data, web data, etc.). The content providers 102 can be any of a number of content provider systems, equipment, and/or devices that provide media content (e.g., radio broadcasting systems, on-air television broadcasting systems, cable service systems, direct satellite broadcasting systems, Internet television service servers, Internet radio station servers, web servers, digital video recorders, etc.). In some implementations, at least a subset of the media contents distributed by the content providers 102 includes audio data (e.g., music, radio programs, television programs, movies, etc.). In some implementations, at least a subset of the media contents distributed by the content providers 102 includes video data (e.g., photos, television programs, movies, etc.). In some implementations, at least a subset of the media contents distributed by the content providers 102 includes multimedia data (e.g., television programs, movies, etc.). In some implementations, at least a subset of the media contents distributed by the content providers 102 includes user-readable text (e.g., messages sent via short message services, postings on blogs or other social networking media, web pages, etc.).

The content providers 102 distribute media contents via the communication networks 104. The communication networks 104 may include one or more of: radio-frequency communication networks used for on-air or satellite television broadcasting, radio-frequency communication networks used for on-air radio broadcasting, cable-based communication networks, digital audio/video communication networks, the Internet, other wide area networks, local area networks, metropolitan area networks, wireless networks, cellular networks, and so on.

In some implementations, the companion device 114 or the integrated television device 116 includes a receiver/converter 106 connected to the communication networks 104 and configured to receive audio and/or video signals, typically via one or more of radio-frequency communication networks and/or one or more digital audio/video communication networks.

In some implementations, the companion device 114 or the integrated television device 116 includes one or more computer communication network interfaces 108 that are configured for interfacing with one or more computer communication networks, such as the Internet, other wide area networks, local area networks, metropolitan area networks, wireless networks, cellular networks, and so on.

The companion device 114 or the integrated television device 116 stores and/or executes applications 122. The applications 122 include application programs used for managing the companion device 114 or the integrated television device 116, including, in some implementations, applications for controlling the display on the television screen of media content from one or more of the content providers 102. For example, at least one of the applications 122 is configured to receive data from the receiver/converter 106 and/or the computer communication network interface 108 and send data and instructions to a graphics module 110 for rendering media and program content, including user interfaces and/or user interface objects.

The graphics module 110 typically includes one or more display processors or graphics processing units for rendering user interfaces and/or user interface objects. In some implementations, the graphics module 110 receives data from the receiver/converter 106 and/or the computer communication network interface 108, and additional data or instructions from the applications 122 for rendering user interfaces and/or user interface objects. The user interfaces and/or user interface objects rendered by the graphics module 110 are sent to the television screen 112 for display. Visual characteristics of the media and program content displayed on the television screen 112 (e.g., the size and detail of particular user interfaces and/or interface objects) typically reflect a number of display parameters of the television screen 112, including display resolution and size of the television screen 112.

The companion device 114 or the integrated television device 116 may include additional components not illustrated in FIG. 1.

Also illustrated in FIG. 1 is a personal device 118. The personal device 118 may be any of a number of computing devices (e.g., Internet kiosk, personal digital assistant, cell phone, smart phone, gaming device, desktop computer, laptop computer, tablet computer, handheld computer, or combinations thereof) used to enable the activities described below. The personal device 118 includes a display screen 120 where a graphical user interface (GUI) can be displayed. In some implementations, the personal device 118 is also configured to receive media content from the content providers 102 via the communication networks 104, and display the received media content.

In some implementations, the applications 122 can be executed on either or both a personal device 118 or a companion device 114, in which case the application output, including user interface elements, is presented on either the television screen 112 or the personal device screen 120. For example, an application can be an Android application that can be executed on a companion device 114 (such as a Google TV-enabled set-top box) and a smart phone/personal device 118 (such as an Android phone). This presents the challenge of providing a user-friendly user interface for an application 122 based on whether its visual outputs are displayed on a personal device screen 120 or on a television screen 112, because the application user interface may be rendered differently depending on the device the application is executed on. At least some of the methods described below with respect to FIGS. 5A-5B address this challenge.

Figure 2:
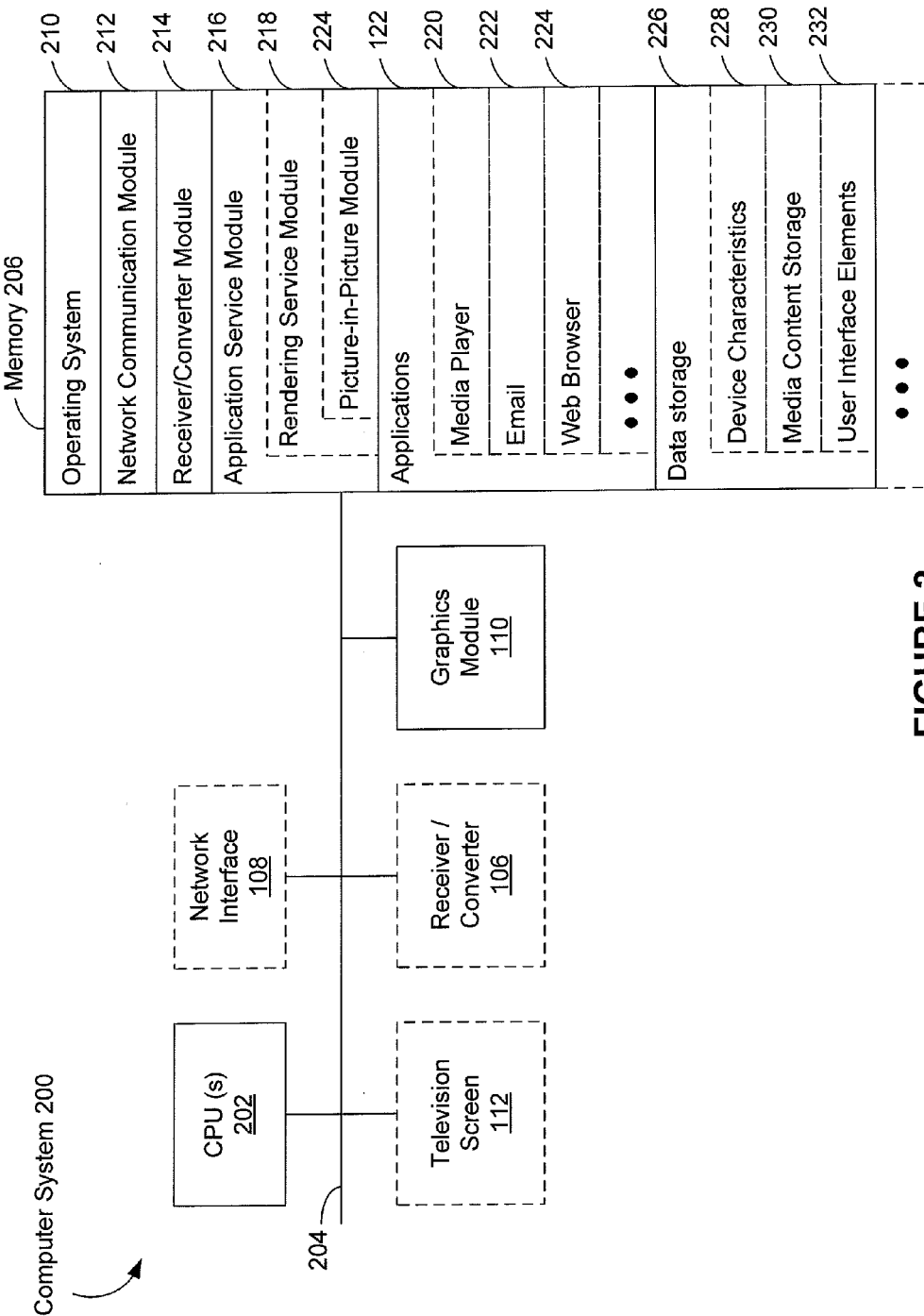
FIG. 2 is a block diagram illustrating a computer system, in accordance with some implementations.

FIG. 2 is a block diagram illustrating a computer system 200 in accordance with some implementations. In some implementations, the computer system 200 corresponds to the companion device 114 or the integrated television device 116 (FIG. 1).

The computer system 200 typically includes one or more processing units (CPUs) 202, graphics module 110, and memory 206. In some implementations, the computer system 200 also includes one or more of: one or more network or other communications interfaces 108, and one or more receivers and/or converters 106. The computer system 200 includes one or more communication buses 204 for interconnecting these components. In some implementations, the communication buses 204 include circuitry (sometimes called a chipset) that interconnects and controls communications between system components. In some other implementations, the computer system 200 includes a user interface (not shown) (e.g., a keyboard, and a mouse or other pointing device). The computer system 200 is coupled with the television screen 112, regardless of whether the television screen 112 is integrated with the computer system 200 or located outside the computer system 200. The television screen 112 may be used to display a graphical user interface.

The memory 206 of the computer system 200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a non-transitory computer readable storage medium. In some implementations, the memory 206 or the computer readable storage medium of the memory 206 stores the following programs, modules and data structures, or a subset thereof:

operating system 210 that includes procedures for handling various basic system services and for performing hardware dependent tasks;
   network communication module (or instructions) 212 that is used for connecting the computer system 200 to the content providers (e.g., content providers 102, FIG. 1) via one or more network interfaces 108 and one or more communications networks 104 (FIG. 1), such as the Internet, other wide area networks, local area networks, metropolitan area networks, wireless networks, cellular networks, and so on;
   receiver/converter module (or instructions) 214 that is used for receiving media content from the content providers (e.g., content providers 102) via one or more receivers/converters 106 and one or more communications networks 104, such as radio-frequency audio/video communication networks, cable-based communication networks, digital audio/video communication networks, and so on;
   application service module 216 that provides various services to the applications 122;
   applications 122 that include various applications executed by the one or more processing units 202 causing the computer system 200 to perform certain operations (e.g., a media player 220, which, when executed, initiates display of media data contents; an email application 222, which, when executed, initiates display of one or more email messages, etc.); and
   data storage 226 that stores various data used by the computer system 200.

The data storage 226 typically includes device characteristics 228 that identify characteristics (e.g., a device type, specifications, operating modes, etc.) of the computer system 200 and/or the television screen 112. For example, the device characteristics 228 may identify that the computer system 200 is coupled with, or embedded in, the television screen 112. Alternatively, the device characteristics may identify that the computer system 200 is embedded in a personal device (e.g., the personal device 118 in FIG. 1, such as a mobile phone) or that the applications 122 are stored in the personal device.

In some implementations, the data storage 226 includes media content storage 230. The media content storage 230 may store complete media data for a particular program (e.g., a music file corresponding to an entire song, multimedia data including an entire length of a television program episode or a movie, etc.), which may be played at a time desired by a user. The media content storage 230 may store a portion of a particular program, which may be used for improving the quality of playing the particular program (e.g., for caching or for content analysis for finding related programs and/or services).

In some implementations, the data storage 226 includes user interface elements 232. In some implementations, the user interface elements 232 include information about user interface elements that are displayed on the television screen 112. The user interface elements 232 are described in detail with respect to FIG. 4.

The application service module 216 includes one or more service modules to provide various application services (e.g., memory management, graphics rendering, etc.) to the applications 122. In some implementations, the application service module 216 is included in the operating system 210. In some implementations, the application service module 216 includes a rendering service module 218 for sending data and/or instructions to the graphics module 110 for rendering user interfaces and/or user interface objects. In some implementations, the rendering service module 218 includes a picture-in-picture module 224, which is used for rendering multiple application user interfaces for simultaneous display (e.g., in a picture-in-picture layout).

In some implementations, the picture-in-picture module 224 retrieves one or more parameters from the user interface elements 232 (e.g., a position and/or size of each user interface object) for rendering a picture-in-picture region.

In some implementations, the picture-in-picture module 224 is associated with a picture-in-picture application programming interface (API). In some implementations where the picture-in-picture module 224 is associated with the picture-in-picture API, the picture-in-picture module 224 is configured to receive inputs (e.g., one or more attributes, such as an initial location, of a respective application 112 with respect to the display of the picture-in-picture region) from one or more applications 112. For example, the picture-in-picture module 224 may receive, from the email application 222, an initial location of a picture-in-picture region for displaying an application user interface of the email application 222 through the picture-in-picture API.

Optionally, the memory 206 may include additional applications, modules, or components. In some implementations, the computer system 200 includes additional components not illustrated in FIG. 2. For example, the computer system 200 may include one or more audio modules for generating and/or amplifying audio signals. The computer system 200 may also include a security module for protecting the data stored in the computer system 200.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various implementations. In some implementations, the memory 206 may store a subset of the modules and data structures identified above. Furthermore, the memory 206 may store additional modules and data structures not described above.

Notwithstanding the discrete blocks in FIGS. 1 and 2, these figures are intended to provide functional descriptions of some implementations rather than structural descriptions of functional elements in the implementations. One of ordinary skill in the art will recognize that an actual implementation might have the functional elements grouped or split among various components. In practice, and as recognized by those of ordinary skill in the art, items shown separately could be combined and some items could be separated. For example, in some implementations, the television screen 112 is included in the computer system 200. In other implementations, the television screen 112 is physically separated from the computer system 200. In some implementations, the CPUs 202 and the memory 206 are included in a single semiconductor package. In some implementations, the CPUs 202 and the graphics module 110 are included in a single semiconductor package. In some implementations, the computer system 200 is implemented on multiple distributed computer systems. In some implementations, the rendering service module 218 and/or the picture-in-picture module 224 are integrated into the application service module 216, and the rendering service module 218 and/or the picture-in-picture module 224 may not exist as separate modules.

The actual number of components used to implement the computer system 200 and the manner in which features are allocated among those components will vary from one implementation to another, and may depend in part on the amount of data traffic that the system must handle during peak usage periods as well as during average usage periods, and may also depend on the amount of data stored by the computer system 200. Moreover, one or more of the blocks (e.g., the television screen 112, and the receiver/converter 106, etc.) in FIGS. 1 and 2 may be implemented on one or more separate devices designed to provide the described functionality. Although the description herein refers to certain features implemented in the television device and the computer system 200, the implementations are not limited to such distinctions. For example, features described herein as being part of the computer system 200 can be implemented in whole or in part in the television device, and vice versa.

FIGS. 3A-3G illustrate exemplary user interfaces displayed on a television screen 112 in accordance with some implementations. As described above, in some implementations, the rendering service module 218 provides the user interface for display on the television screen 112. It should be noted that FIGS. 3A-3G are not drawn to scale.

Figure 3A:
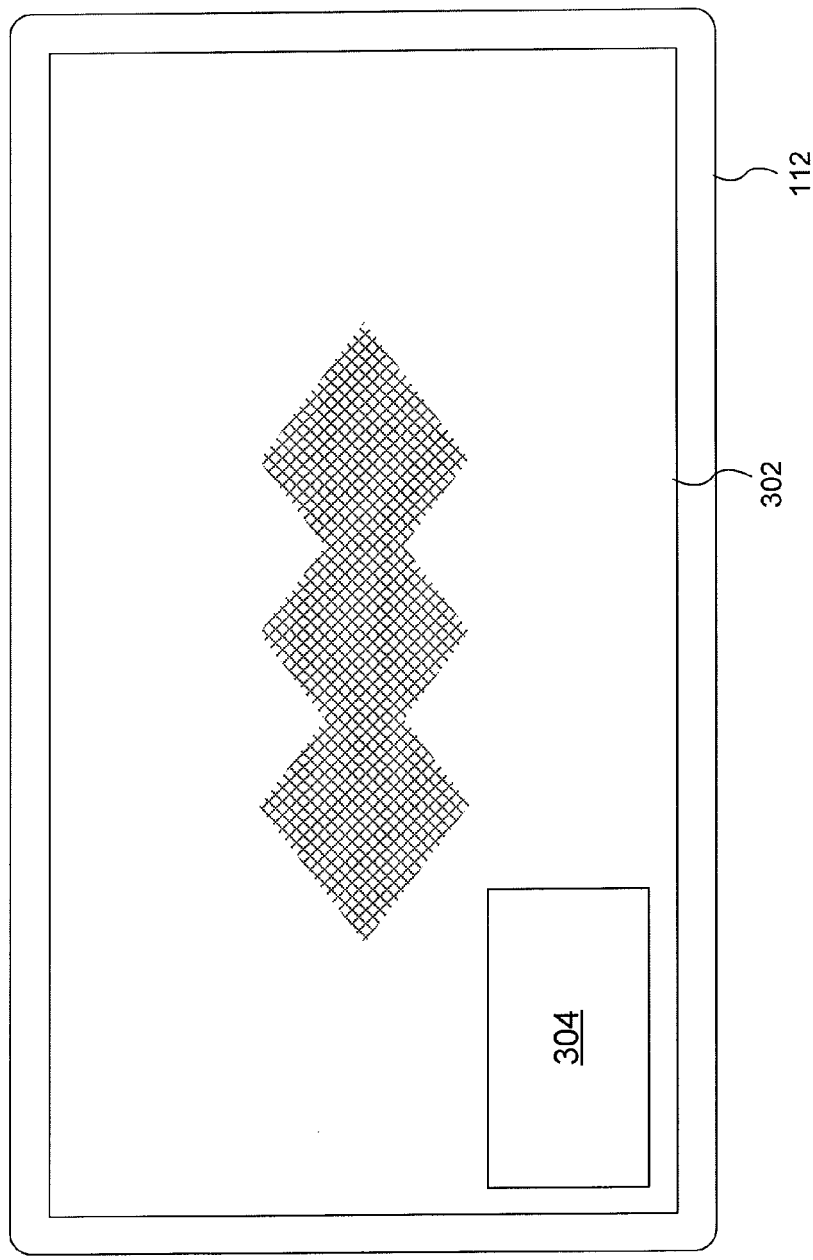
FIGS. 3A-3G illustrate exemplary user interfaces in accordance with some implementations.

In FIG. 3A, the television screen 112 displays a user interface 302 of a first application (e.g., a media player 220, FIG. 2). The television screen 112 also displays a user interface 304 of a second application (e.g., an email application 222, FIG. 2). As shown in FIG. 3A, the user interface 304 is displayed in a picture-in-picture region (e.g., the user interface 304 is displayed in a region smaller than the entire television screen 112). In some implementations, the position of the picture-in-picture region is selected so that the picture-in-picture region does not overlap with one or more predefined regions of the user interface 302 (e.g., a central region of the user interface of the first application, a caption region of the user interface 302, a control region of the user interface of the first application, etc.).

Figure 3B:
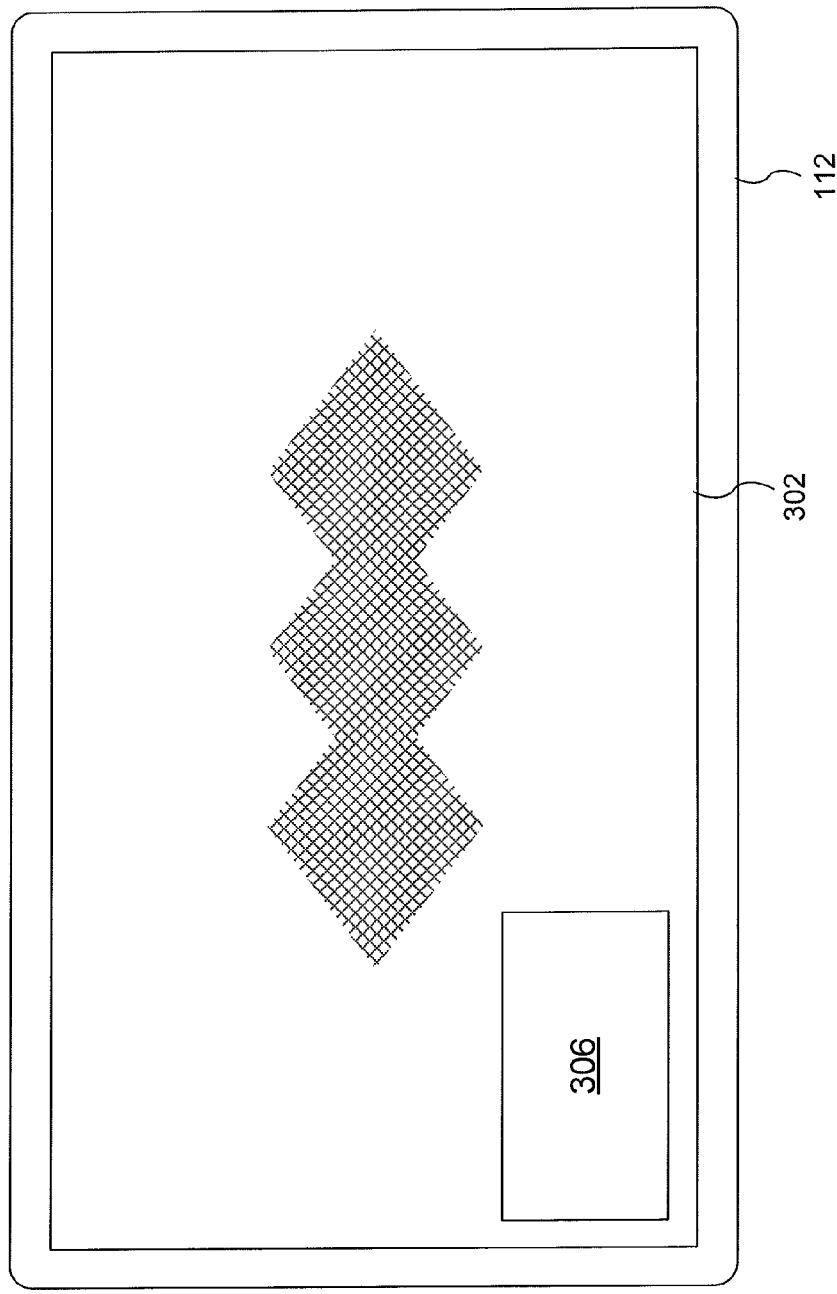

FIG. 3B illustrates that, in response to a request for a user interface of a third application (e.g., a web browser 224, FIG. 2), the user interface 304 in the picture-in-picture region is replaced with a user interface 306 of the third application.

Figure 3C:
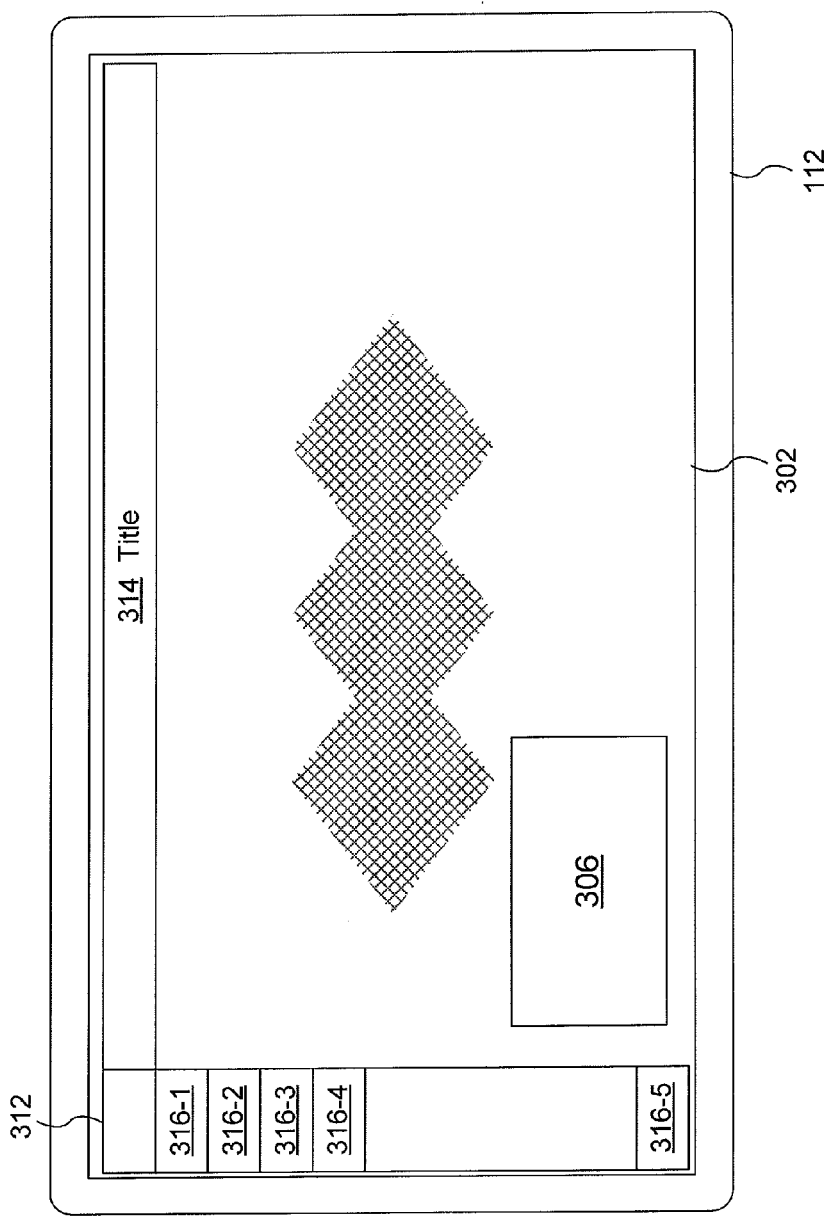

FIG. 3C illustrates that, in response to a request for a menu, the menu 312 is displayed. The menu 312 includes a title 314 of the first application, and one or more user interface objects (e.g., user interface objects 316-1 through 316-5). Respective user interface objects, when activated by the user, initiate respective operations. It should be noted that, upon displaying the menu 312, the position of the user interface 306 is changed so that the user interface 306 does not overlap with the menu 312.

Figure 3D:
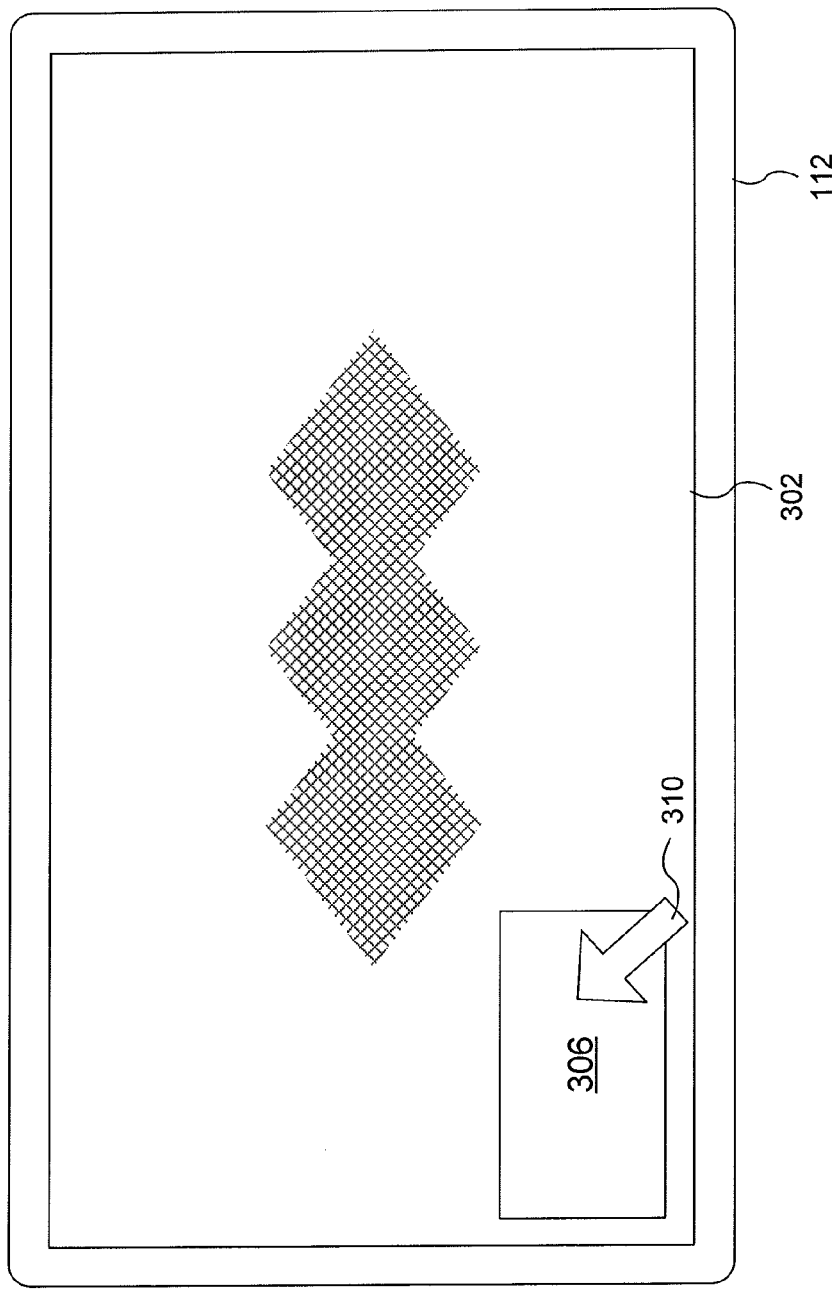
Figure 3E:
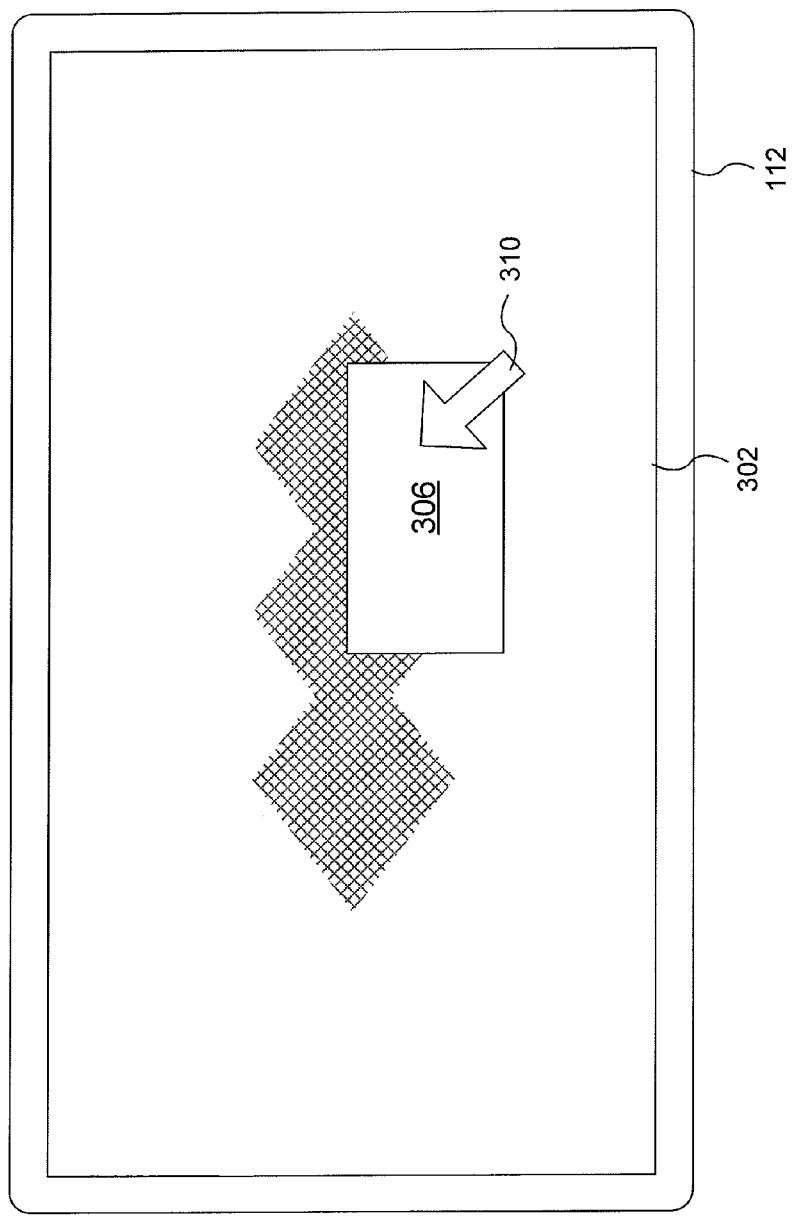

FIGS. 3D and 3E illustrate operations for moving the picture-in-picture region in accordance with some implementations. In FIG. 3D, the user interface 306 is displayed in the picture-in-picture region. Also shown in FIG. 3D is a cursor (or a pointer) 310 at a location on the television screen 112 that corresponds a location inside the user interface 306.

FIG. 3E illustrates that the picture-in-picture region (and the user interface 306 shown in the picture-in-picture region) is moved in accordance with the movement of the cursor 310. In some implementations, the picture-in-picture region moves with the movement of the cursor 310 while the cursor 310 is activated or the picture-in-picture region is selected (e.g., in accordance with a separate input, such as pressing-and-holding a preselected button on a television remote control).

Figure 3F:
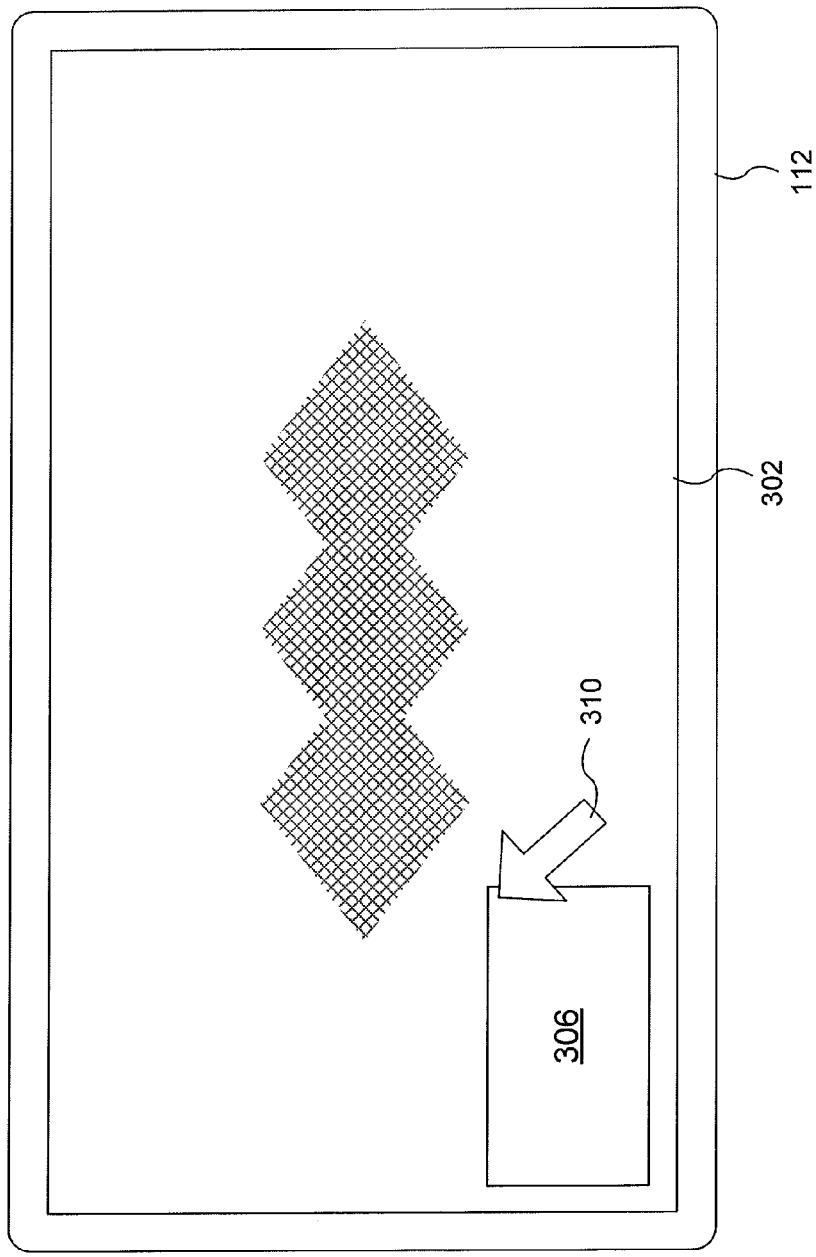
Figure 3G:
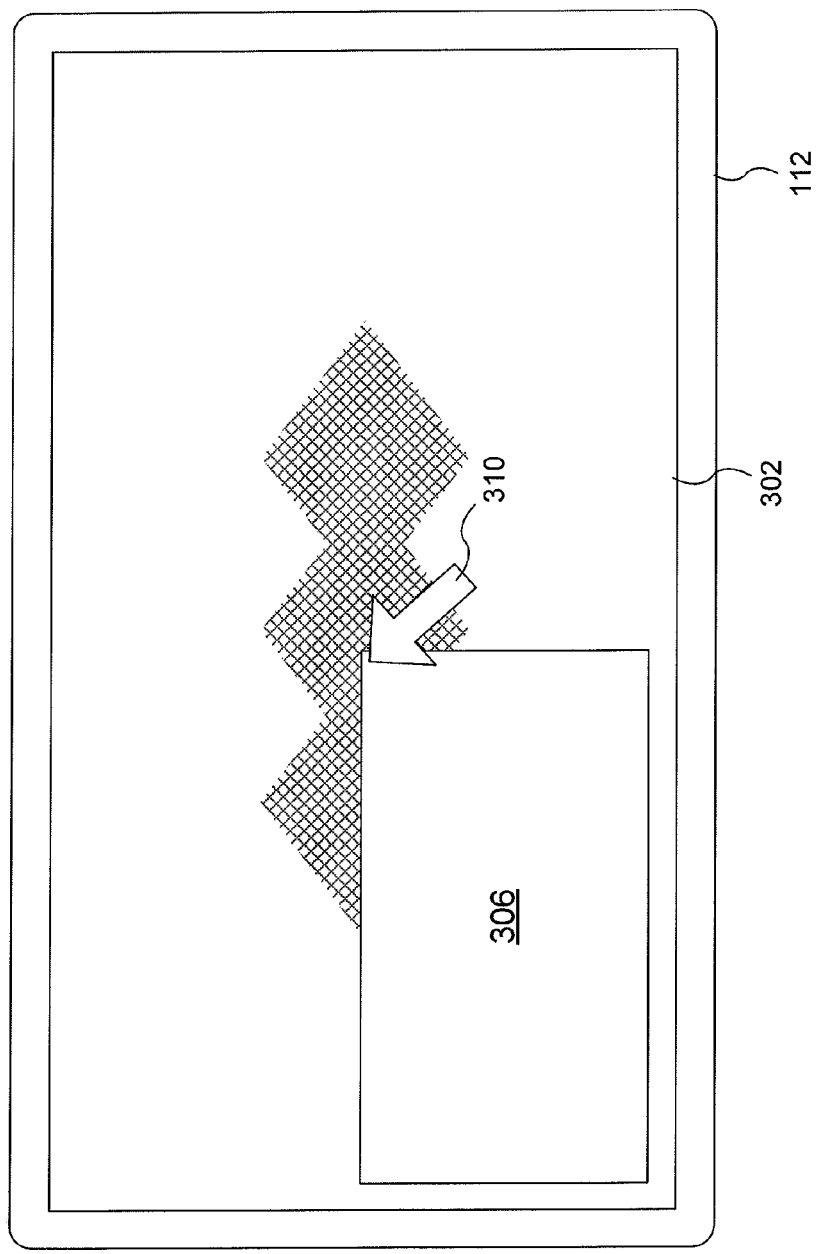

FIGS. 3F and 3G illustrate operations for resizing the picture-in-picture region. In FIG. 3F, the user interface 306 is displayed in the picture-in-picture region. Also shown in FIG. 3F is a cursor (or a pointer) 310 at a location on the television screen 112 that corresponds to a corner or an edge of the picture-in-picture region.

FIG. 3G illustrates that the picture-in-picture region (and the user interface 306 shown in the picture-in-picture region) is resized in accordance with the movement of the cursor 310. In some implementations, the picture-in-picture region is resized with the movement of the cursor 310 while the cursor 310 is activated or the picture-in-picture region is selected (e.g., in accordance with a separate input, such as pressing-and-holding a preselected button on the television remote control).

Figure 4:
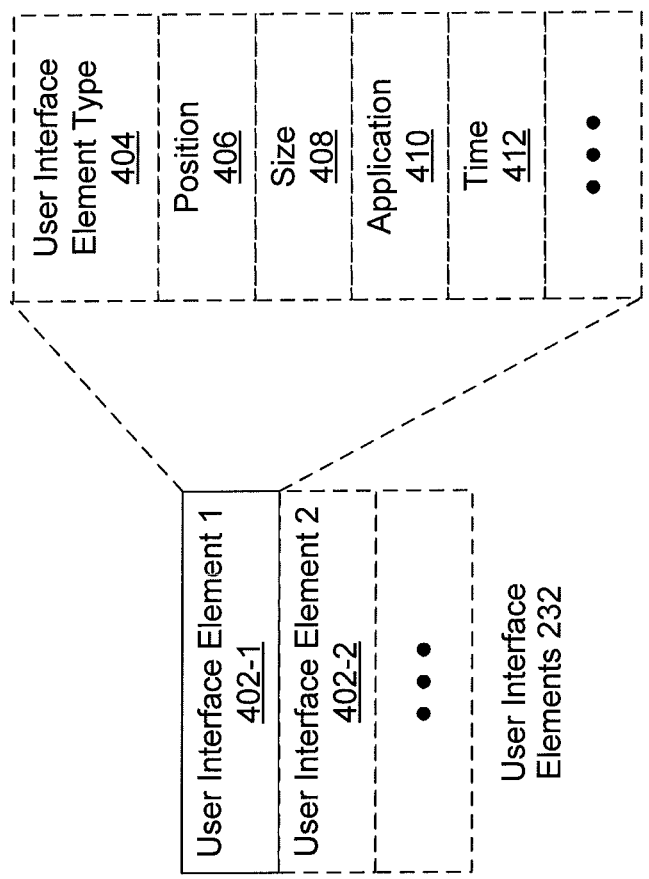
FIG. 4 is a block diagram illustrating an exemplary data structure, in accordance with some implementations.

FIG. 4 is a block diagram illustrating an exemplary data structure for the user interface elements 232 (FIG. 2), in accordance with some implementations. In some implementations, the user interface elements 232 include all user interface elements that are configured to be displayed by respective applications on a respective device (e.g., the personal device 118 as well as the companion device 114 or the integrated television device 116). In some implementations, the user interface elements 232 include one or more user interface elements 402 that are configured to be displayed by respective applications on the respective device based on a type of the respective device (e.g., whether the device is coupled to, or embedded in, a television screen, or whether the device is a personal device).

In some implementations, a respective user interface element 402-1 includes the following, a subset or superset thereof:
- a user interface element type 404, which indicates a type of a corresponding user interface element (e.g., whether the corresponding user interface element is a button, a text bar, etc.);
- a position 406 (e.g., X-Y coordinates of the corresponding user interface element);
- a size 408 (e.g., the width and height of the corresponding user interface element in a number of pixels or a percentage of the width and/or height of the television screen 112, FIG. 2);
- an application 410 indicating an application which is configured to provide the respective user interface element 402-1 for display (e.g., the media player application 220 or the email application 222, FIG. 2); and
- time 412, which indicates a particular time point (e.g., 15 minutes into playing a movie, or at 2:00 pm) or a particular period of time (e.g., between 10 and 20 minutes into playing a movie, between 2:00 pm and 2:10 pm, etc.) when the respective user interface element 402-1 is configured for display.

In some implementations, the time 412 for the respective user interface element 402-1 is received from a content provider 102 (FIG. 102). In some implementations, the time 412 is included (e.g., embedded) in media content provided by the content provider 102. In other implementations, the time 412 is communicated separately from the content provider 102 to the computer system 200.

In some implementations where the respective user interface element 402-1 includes the application 410, the application 410 may include one or more values (or two or more values) indicating two or more applications that are configured to provide the respective user interface element 402-1 for display. In other words, the respective user interface element 402-1 may be displayed in multiple applications. In some implementations, the application 410 may include a value (e.g., a null value) indicating that the respective user interface element 402-1 is configured for display in all applications or on a home screen.

In some implementations where the respective user interface element 402-1 includes the time 412, the time 412 may include one or more values (or two or more values) indicating two or more time points or particular periods of time, at or during which the respective user interface element 402-1 is provided for display. In other words, the respective user interface 402-1 may be displayed at multiple time points (e.g., at 15 minutes into the movie and also at 30 minutes into the movie) or during multiple periods of time (e.g., between 2:00 pm and 2:15 pm and 3:30 pm and 3:50 pm). In some implementations, the time 412 may include a value (e.g., a null value) indicating that the respective user interface element 402-1 is configured for display at all times.

In some implementations, information (e.g., the position 406 and the size 408) in the respective user interface element 402-1 is used to determine a location of a picture-in-picture region on display. For example, the location of the picture-in-picture region is determined to avoid or minimize an overlap or occlusion of displayed user interface elements (e.g., the respective user interface element 402-1). In other implementations, the respective user interface element 402-1 is used to indicate the location and size of the picture-in-picture region.

The user interface elements 232 may include more or fewer data fields.

FIGS. 5A-5B are flowcharts representing a method for rendering application user interfaces, in accordance with some implementations. The method 500 is performed at a computer system coupled with the television screen. For example, the computer system may be the companion device 114 coupled with a television device, or the computer system may be embedded in the integrated television device 116 (FIG. 1). Alternatively, the computer system may be the personal device 118. The computer system includes one or more processors and memory storing a plurality of applications for execution by the one or more processors.

The computer system provides (502) a user interface of a first application of the plurality of applications for display on the television screen (e.g., the user interface 302, FIG. 3A). For example, the first application may be the email application 222 (FIG. 2) and the second application may be the media player 220 (FIG. 2).

While providing the user interface of the first application for display on the television screen, the computer system provides (504) a user interface of a second application, distinct from the first application, of the plurality of applications for concurrent display with the user interface of the first application, in a predefined user interface region, on the television screen (e.g., the user interface 304, FIG. 3A). For example, the second application may be the web browser 224 (FIG. 2). Providing the user interface of the second application typically includes executing the second application by the one or more processors.

In some implementations, one of the first application and the second application is (506) a media player (e.g., a TV or movie player), and the second application is distinct from the first application (e.g., the email application 222 or web browser 224, FIG. 2).

In some implementations, the user interface of the first application and the user interface of the second application collectively correspond (508) to a substantially entire portion of the television screen (e.g., at least 75%, 80%, 90%, 95%, or 100% of the entire television screen). In other words, the user interface of the first application and the user interface of the second application together may occupy the entire television screen, as shown in FIG. 3A. Similarly, in some implementations, the user interface of the first application and the user interface of the third application collectively correspond to the entire television screen.

In some implementations, a position of the predefined user interface region is (510) at least initially determined by the first application. For example, the first application may retrieve user interface elements 402 (FIG. 4) corresponding to the first application (e.g., based on the application 410 indicated in respective user interface elements 402), and identify an area or region on the television screen that is large enough to display the predefined user interface region (e.g., a picture-in-picture region) without occlusion of displayed user interface elements. Alternatively, one of the user interface elements 402 may indicate a position and size of the predefined user interface region (e.g., the picture-in-picture region). Thus, in some implementations, a size of the predefined user interface region is at least initially determined by the first application.

In some implementations, the computer system provides (512) one or more user interface objects for display on the television screen, wherein the predefined user interface region is positioned in accordance with positions of the one or more user interface objects. In some implementations, the size of the predefined user interface region is determined in accordance with positions and sizes of the one or more user interface objects so that the predefined user interface region (e.g., the picture-in-picture region) does not contact or occlude any of the one or more user interface objects.

While providing the user interface of the second application for concurrent display with the user interface of the first application on the television screen, the computer system receives (514) a request for a user interface of a third application, distinct from the first application and the second application, of the plurality of applications. In some implementations, the request for the user interface of the third application is based on a series of user inputs on a remote controller (e.g., pressing buttons to select the third application).

In response to receiving the request for the user interface of the third application, the computer system provides (516, FIG. 5B) a user interface of the third application, instead of the user interface of the second application, for concurrent display with the user interface of the first application, in the predefined user interface region, on the television screen. In other words, the user interface of the second application is replaced with the user interface of the third application in the predefined user interface region (e.g., the picture-in-picture region), and the user interface of the third application is concurrently displayed with the first user application. For example, in FIGS. 3A and 3B, the user interface 304 in the picture-in-picture region is replaced with the user interface 306.

In some implementations, providing the user interface of the third application includes (518): initiating execution of the third application by the one or more processors, and ceasing the execution of the second application by the one or more processors. In other words, the computer system executes the second application while providing the user interface of the second application. Thereafter, the computer system stops the execution of the second application and initiates the execution of the third application when the user interface of the second application is replaced with the user interface of the third application.

In some other implementations, providing the user interface of the third application includes (520): initiating execution of the third application by the one or more processors, and maintaining the execution of the second application by the one or more processors. In other words, the computer system executes the second application while providing the user interface of the second application. Thereafter, the computer system continues to execute the second application even though the user interface of the second application is no longer provided for display.

In some implementations, providing the user interface of the second application includes (522) providing a first position of the predefined user interface region, where the first position of the predefined user interface region is at least initially determined by the second application. For example, the second application (e.g., the media player 220, FIG. 2) may include a preselected position for the predefined user interface region (e.g., the picture-in-picture region) so that when a user interface of the second application is displayed in the predefined user interface region, the predefined user interface region is at least initially positioned at a location that has been preselected for the second application. Providing the user interface of the third application includes providing a second position of the predefined user interface region, where the second position of the predefined user interface region is at least initially determined by the third application.

In some embodiments, providing the user interface of the second application includes providing a first size of the predefined user interface region, wherein the first size of the predefined user interface region is at least initially determined by the second application. Providing the user interface of the third application includes providing a second size of the predefined user interface region, wherein the second size of the predefined user interface region is at least initially determined by the third application.

In some implementations, the computer system updates the position of the predefined user interface region in accordance with the positions and/or sizes of other displayed user interface elements. For example, in FIGS. 3B and 3C, with the display of the menu 312, the position of the user interface 306 in the picture-in-picture region is changed so that the user interface 306 does not overlap with the menu 312. In some implementations, when the first application is a media player, the computer system continues to update the position of the predefined user interface region while media content is being played by the media player so that the picture-in-picture region does not overlap with any preselected user interface element or region of the user interface of the first application. For example, when a caption or a key figure is displayed on a television screen at a position where the picture-in-picture region is located, the location of the picture-in-picture region is changed so that the picture-in-picture region does not block the caption or the key figure.

In some implementations, the computer system receives (524) a request to move the predefined user interface region (i.e., move an application user interface displayed in the predefined user interface region); and, in response to receiving the request to move the predefined user interface region, moves the predefined user interface region in accordance with the request (e.g., FIGS. 3D-3E). Moving the predefined user interface region includes concurrently moving the application user interface displayed in the predefined user interface region (e.g., the user interface of the second application, the user interface of the third application, etc).

In some implementations, receiving the request includes (526) receiving a user input at a respective location on the television screen, where the respective location corresponds to a location inside the predefined user interface region. For example, in FIG. 3D, the cursor (or pointer) 310 points to a location inside the predefined user interface region 306 when the request to move the predefined user interface region 306 is received (e.g., when the predefined user interface region 306 is selected).

In some implementations, the computer system receives (528) a request to resize the predefined user interface region; and, in response to receiving the request to resize the predefined user interface region, resizes the predefined user interface region in accordance with the request (e.g., FIGS. 3F-3G).

In some embodiments, while providing the user interface of the third application for concurrent display with the user interface of the first application, in the predefined user interface region, on the television screen, the computer system receives a request for a user interface of a fourth application. In response to receiving the request for the user interface of the fourth application, the computer system determines whether the fourth application is configured for display in the predefined user interface region. In accordance with the determination that the fourth application is configured for display in the predefined user interface region, the computer system provides a user interface of the fourth application, instead of the user interface of the third application, for concurrent display with the user interface of the first application, in the predefined user interface region, on the television display. Alternatively, in accordance with the determination that the fourth application is not configured for display in the predefined user interface region, the computer system disregards the request for the user interface of the fourth application. In some embodiments, determining whether the fourth application is configured for display in the predefined user interface region includes receiving one or more values from the fourth application that indicate whether the fourth application is configured for display in the predefined user interface region. This allows the developers of the fourth application to decide whether the fourth application should be displayed in the predefined user interface region, and/or conditions under which the fourth application is configured for display in the predefined user interface region.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will be understood that, although the terms first, second, etc. have been used herein to describe various elements, these elements should not be limited by these terms. These terms are only used to distinguish one element from another. For example, a first application could be termed a second application, and, similarly, a second application could be termed a first application. The first application and the second application are both applications, but they are not the same application.

The terminology used in the description of the implementations herein is for the purpose of describing particular implementations only and is not intended to be limiting of the claims. As used in the description of the implementations and the appended claims and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

What is claimed is:

1. A method for rendering application user interfaces on a television screen, comprising:
    at a computer system coupled with the television screen, the computer system comprising one or more processors and memory storing a plurality of applications for execution by the one or more processors:
    providing a user interface of a first application of the plurality of applications for display on the television screen;
    while providing the user interface of the first application for display on the television screen, providing a user interface of a second application of the plurality of applications, distinct from the first application, for concurrent display with the user interface of the first application, in a predefined user interface region on the television screen partially overlaying the user interface of the first application, wherein a first position of the predefined user interface region is at least initially determined by the first application prior to initial display of the user interface of the second application;
    while providing the user interface of the second application for concurrent display with the user interface of the first application on the television screen, receiving a request for a user interface of a third application, distinct from the first application and the second application, of the plurality of applications; and
    in response to receiving the request for the user interface of the third application, providing the user interface of the third application, instead of the user interface of the second application, for concurrent display with the user interface of the first application, in the predefined user interface region, on the television screen; wherein:
    providing the user interface of the second application includes maintaining execution of the second application by the one or more processors; and
    providing the user interface of the third application includes:
        initiating execution of the third application by the one or more processors, and
        maintaining updates to the second application by the one or more processors while not displaying the user interface of the second application.

2. The method of claim 1, wherein one of the first application and the second application is a media player, and the second application is distinct from the first application.

3. The method of claim 1, wherein the user interface of the first application and the user interface of the second application collectively correspond to a substantially entire portion of the television screen.

4. The method of claim 1, wherein:
    providing the user interface of the third application includes providing a second position of the predefined user interface region, the second position of the predefined user interface region being at least initially determined by the third application.

5. The method of claim 1, including providing one or more user interface objects for display on the television screen, wherein the predefined user interface region is positioned in accordance with positions of the one or more user interface objects.

6. The method of claim 1, further comprising:
    receiving a request to move the predefined user interface region; and, in response to receiving the request to move the predefined user interface region, moving the predefined user interface region in accordance with the request.

7. The method of claim 1, further comprising:
receiving a request to resize the predefined user interface region; and,
in response to receiving the request to resize the predefined user interface region, resizing the predefined user interface region in accordance with the request.

8. The method of claim 6, wherein receiving the request includes receiving a user input at a respective location on the television screen, the respective location corresponding to a location inside the predefined user interface region.

9. A computer system, comprising one or more processors and memory storing one or more programs for execution by the one or more processors, the one or more programs including instructions for:
providing a user interface of a first application for display on the television screen;
while providing the user interface of the first application for display on the television screen, providing a user interface of a second application, distinct from the first application, for concurrent display with the user interface of the first application, in a predefined user interface region on the television screen partially overlaying the user interface of the first application, wherein a first position of the predefined user interface region is at least initially determined by the first application prior to initial display of the user interface of the second application;
while providing the user interface of the second application for concurrent display with the user interface of the first application on the television screen, receiving a request for a user interface of a third application, distinct from the first application and the second application, of the plurality of applications; and
in response to receiving the request for the user interface of the third application, providing the user interface of the third application, instead of the user interface of the second application, for concurrent display with the user interface of the first application, in the predefined user interface region, on the television screen; wherein:
providing the user interface of the second application includes maintaining execution of the second application by the one or more processors; and
providing the user interface of the third application includes:
initiating execution of the third application by the one or more processors, and
maintaining updates to the second application by the one or more processors while not displaying the user interface of the second application.

10. The computer system of claim 9, wherein the user interface of the first application and the user interface of the second application collectively correspond to a substantially entire portion of the television screen.

11. The computer system of claim 9, wherein:
providing the user interface of the third application includes providing a second position of the predefined user interface region, the second position of the predefined user interface region being at least initially determined by the third application.

12. A non-transitory computer readable storage medium, storing one or more programs for execution by one or more processors of a computer system, the one or more programs including instructions for:
providing a user interface of a first application for display on the television screen;
while providing the user interface of the first application for display on the television screen, providing a user interface of a second application, distinct from the first application, for concurrent display with the user interface of the first application, in a predefined user interface region on the television screen partially overlaying the user interface of the first application, wherein a first position of the predefined user interface region is at least initially determined by the first application prior to initial display of the user interface of the second application;
while providing the user interface of the second application for concurrent display with the user interface of the first application on the television screen, receiving a request for a user interface of a third application, distinct from the first application and the second application, of the plurality of applications; and
in response to receiving the request for the user interface of the third application, providing the user interface of the third application, instead of the user interface of the second application, for concurrent display with the user interface of the first application, in the predefined user interface region, on the television screen; wherein:
providing the user interface of the second application includes maintaining execution of the second application by the one or more processors; and
providing the user interface of the third application includes:
initiating execution of the third application by the one or more processors, and
maintaining updates to the second application by the one or more processors while not displaying the user interface of the second application.

13. The non-transitory computer readable storage medium of claim 12, wherein:
providing the user interface of the third application includes providing a second position of the predefined user interface region, the second position of the predefined user interface region being at least initially determined by the third application.

14. The non-transitory computer readable storage medium of claim 12, wherein the user interface of the first application and the user interface of the second application collectively correspond to a substantially entire portion of the television screen.

* * * * *